June 10, 1969  W. G. HOOVER  3,449,591
HIGH-SPEED SWITCHING SYSTEM
Filed May 20, 1966  Sheet 1 of 5

INVENTOR.
WILLIAM G. HOOVER
BY
ATTORNEYS

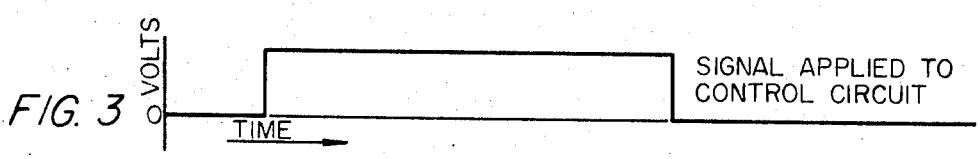
FIG. 3 SIGNAL APPLIED TO CONTROL CIRCUIT
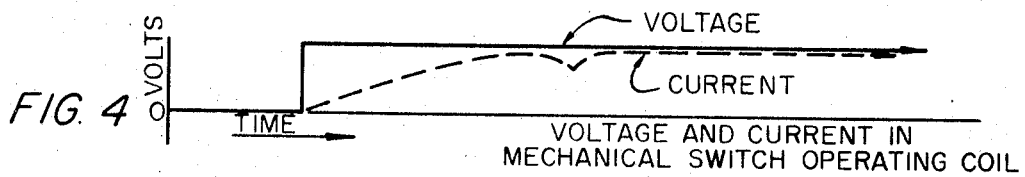
FIG. 4 VOLTAGE AND CURRENT IN MECHANICAL SWITCH OPERATING COIL
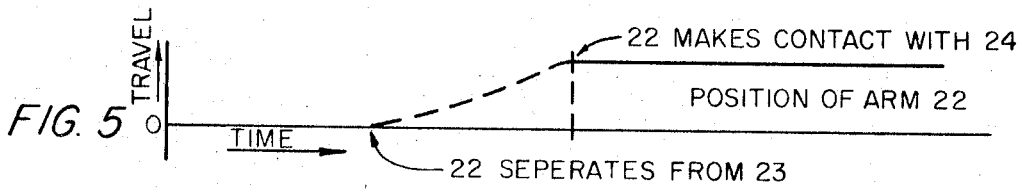
FIG. 5 POSITION OF ARM 22
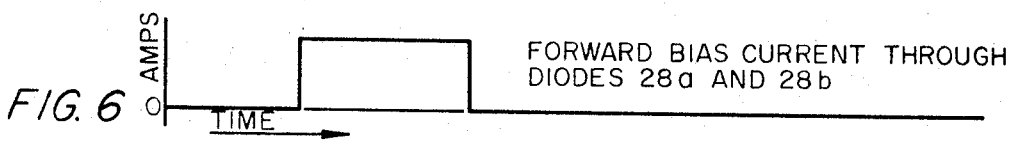
FIG. 6 FORWARD BIAS CURRENT THROUGH DIODES 28a AND 28b
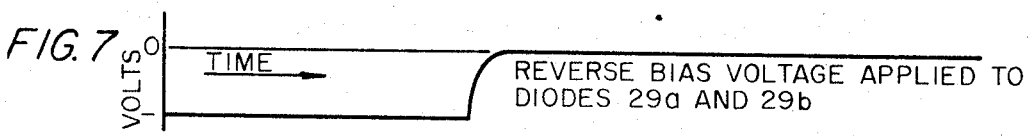
FIG. 7 REVERSE BIAS VOLTAGE APPLIED TO DIODES 29a AND 29b
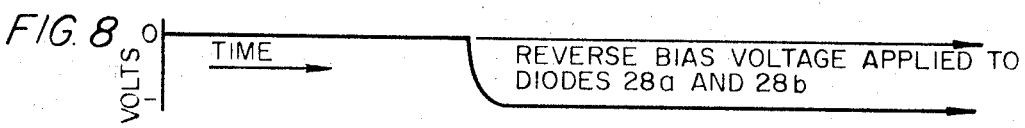
FIG. 8 REVERSE BIAS VOLTAGE APPLIED TO DIODES 28a AND 28b
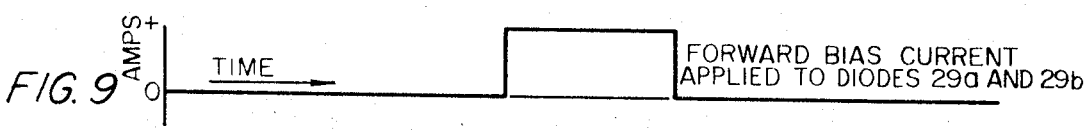
FIG. 9 FORWARD BIAS CURRENT APPLIED TO DIODES 29a AND 29b
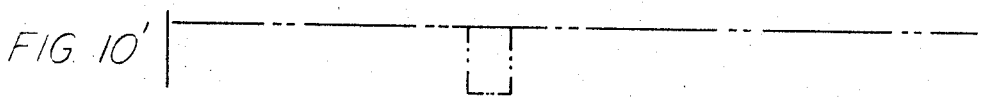
FIG. 10

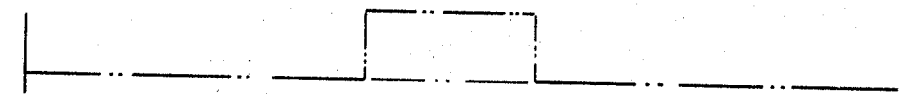
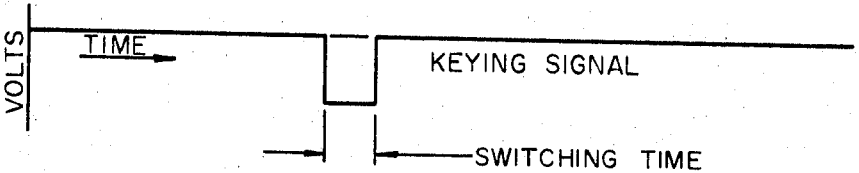
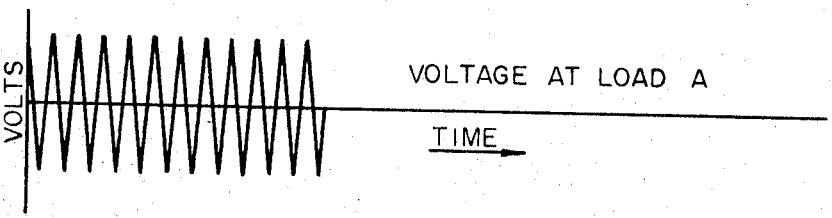
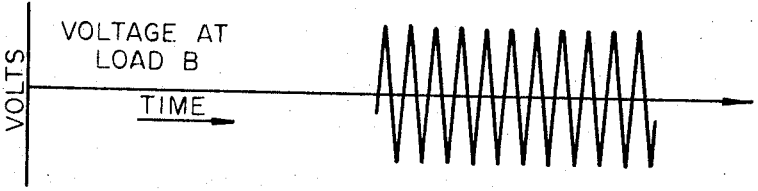
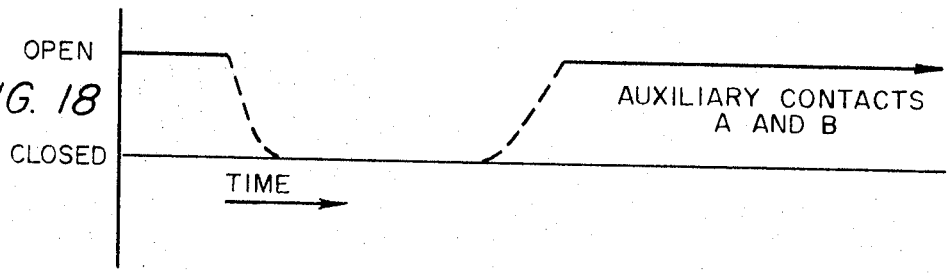

ated June 10, 1969

United States Patent Office 3,449,591
Patented June 10, 1969

3,449,591
HIGH-SPEED SWITCHING SYSTEM
William G. Hoover, Los Altos Hills, Calif., assignor to Granger Associates, Palo Alto, Calif., a corporation of California
Filed May 20, 1966, Ser. No. 551,707
Int. Cl. H01h 9/30
U.S. Cl. 307—136
4 Claims

ABSTRACT OF THE DISCLOSURE

A high-speed switching system for transferring large amounts of power form one load to a second load with high timing accuracy. A mechanical switch has its moving contact arm coupled to a source of power and switches between a pair of contacts one associated with each of two loads. In shunt with the mechanical switch are two low impedance paths each including a pair of diodes connected in push-pull arrangement. These paths temporarily carry the load current when the mechanical switch is in the process of switching.

---

This invention relates generally to a high-speed switching system and more particularly to a system for rapidly switching electrical power at high power levels.

There are many applications in the communication field where rapid switching at relatively high power levels is desirable or necessary. For example, in adaptive communication systems, it is often desirable to change operating frequency rapidly. This is accomplished by switching excitation from one resonant circuit to another. In other applications, it is desirable to rapidly switch power from one antenna to another.

There are applications in other fields for systems to rapidly switch electrical power with minimum disruption.

At high power levels, the high currents involved require very low resistance conducting path. Consequently, switches for this purpose require heavy metal-to-metal contacts. The spacing of open contacts for high power, high voltage applications is relatively large. Closure of such switches requires considerable time, usually several milliseconds, because of the inertia of the parts and the distance they must travel. Furthermore, the switch may bounce to momentarily open following closure which interrupts the energy after closure and may cause arcing of the contacts.

If high speed information or data, for example, Teletype, is to flow during a switching operation without significant distortion during switching, the switching time must be relatively short. At low power levels, the high-speed switching can be accomplished with solid state switches, such as diodes. However, semiconductor or solid state devices cannot handle large amounts of power for prolonged periods of time.

It is a general object of the present invention to provide an improved high-speed switching system.

It is another object of the present invention to provide a switching system suitable for rapidly switching radio frequency energy at high power levels.

It is another object of the present invention to provide a switching system for load switching.

It is a further object of the present invention to provide a hybrid switching system, that is, a system employing mechanical and solid state switching devices in combination.

It is still a further object of the present invention to provide a switching system employing solid state switching means in parallel with a mechanical switch whereby the energy is handled by the high speed solid state switching means as the mechanical switch is opened and closed.

The foregoing and other objects of the invention will become more clearly apparent from the following description taken in conjunction with the accompanying drawings.

Figure 1:
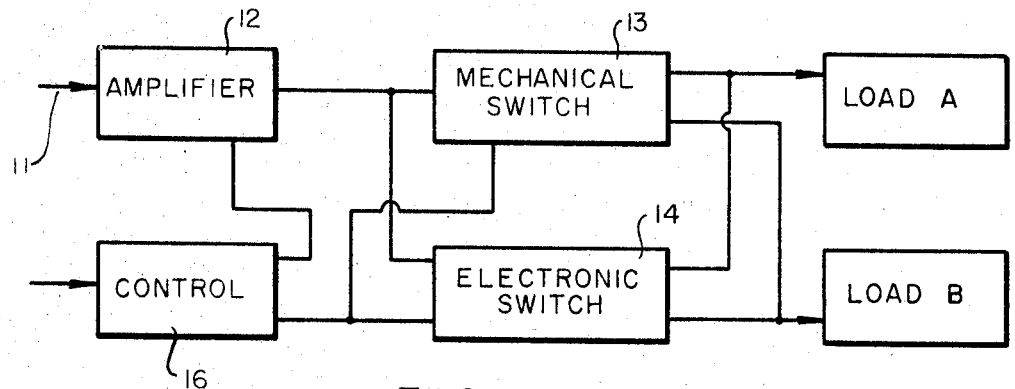
Figure 2:
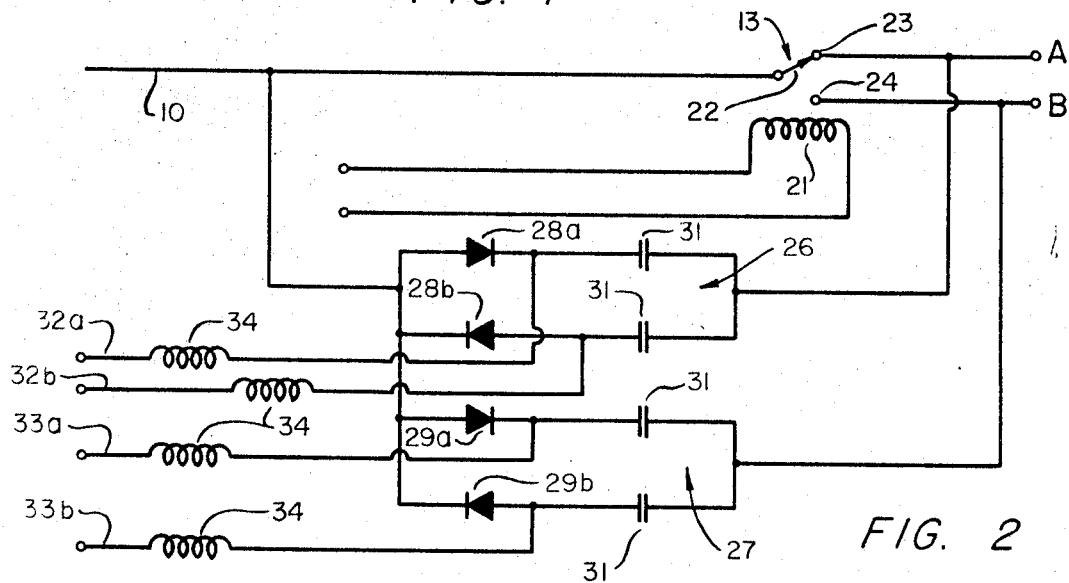
Figure 13:
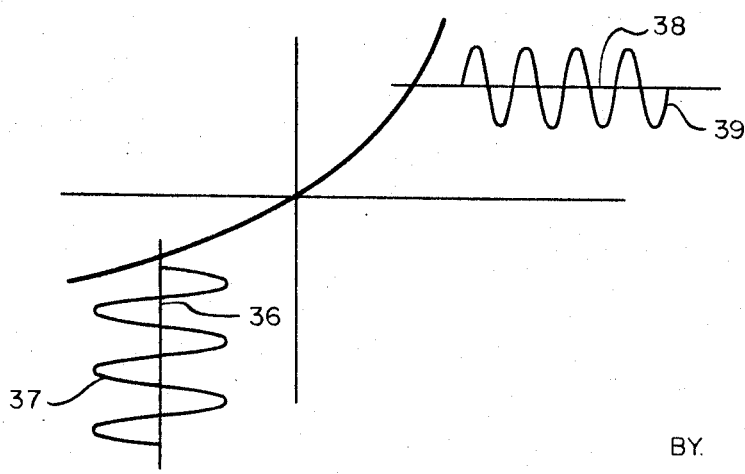
Figure 14:
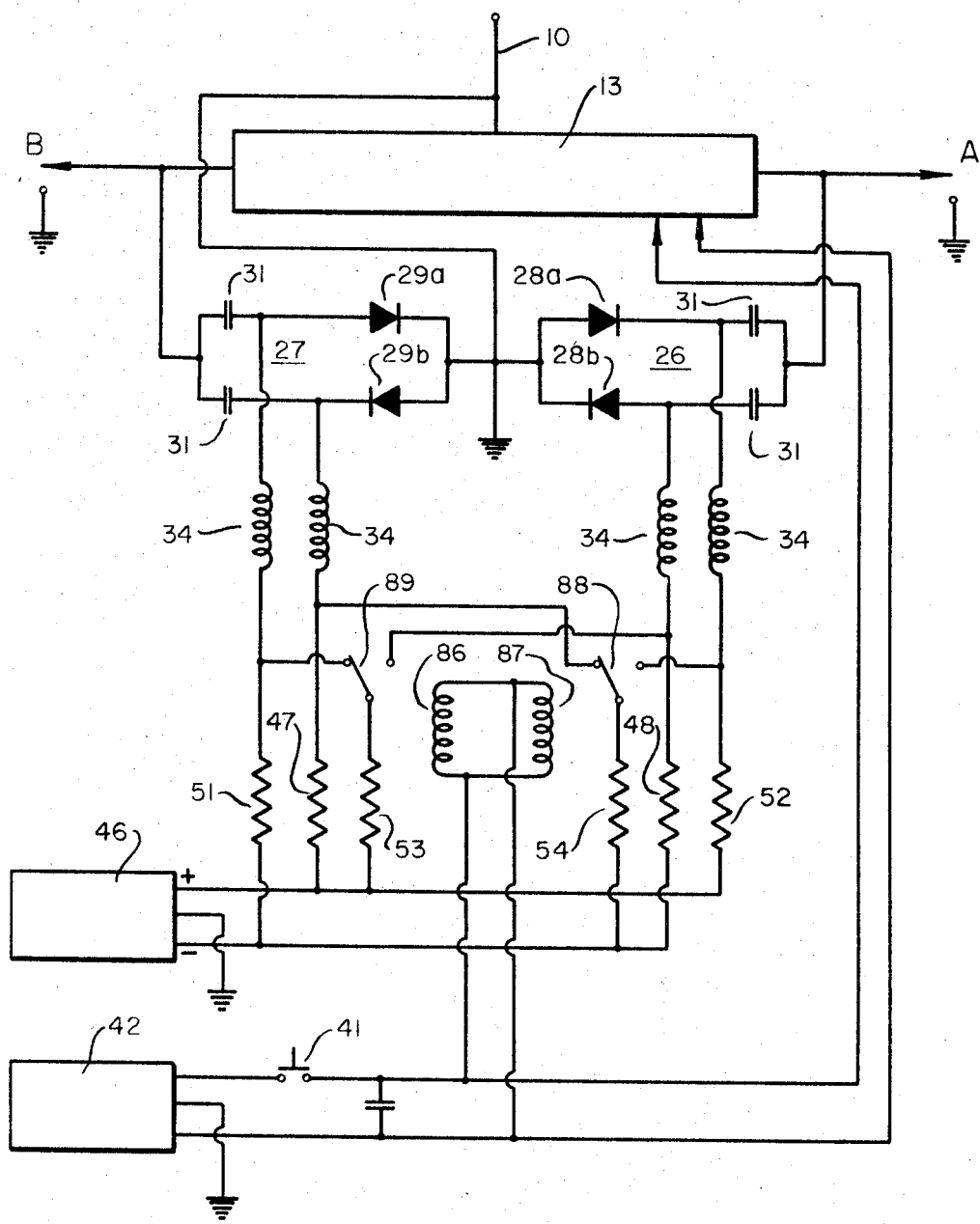
Figure 15:
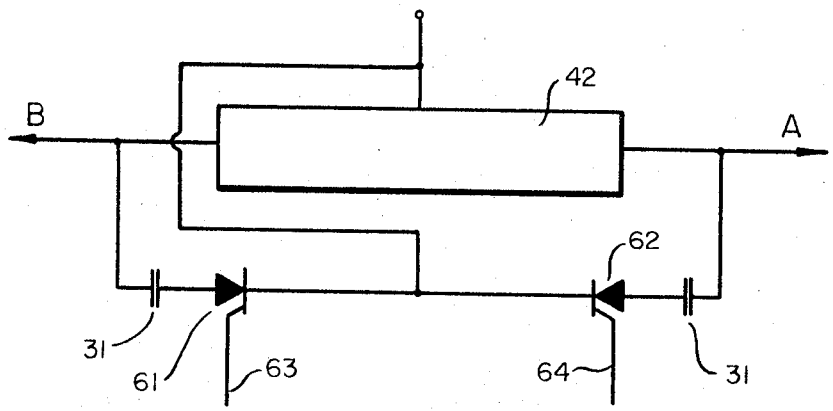
Figure 16:
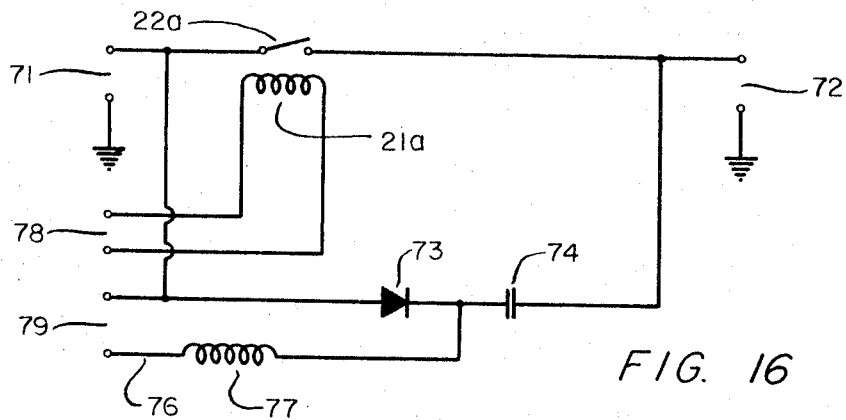
Figure 17:
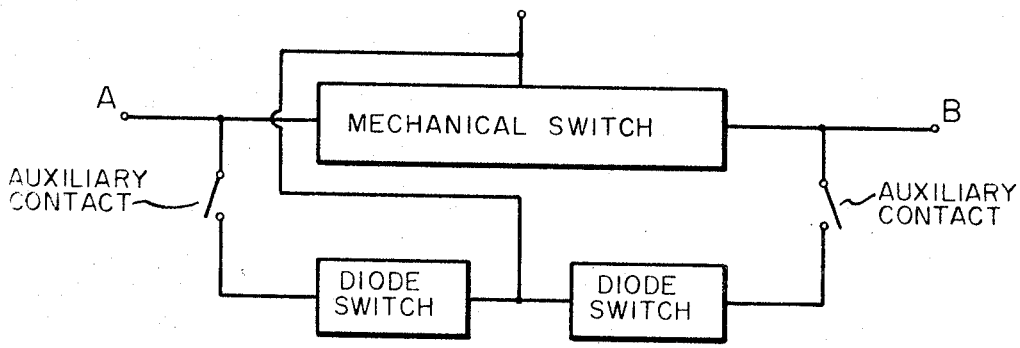

Referring to the drawings:
FIGURE 1 is a block diagram showing a hybrid switching system in accordance with the present invention;
FIGURE 2 is a detailed circuit diagram of the switching system shown in FIGURE 1;
FIGURES 3–12 show the voltage and current waveforms and mechanical movement at various parts of the circuit of FIGURES 1 and 2;
FIGURE 13 is a diagram showing the voltage current characteristics of a typical solid state switching device and the RF waveforms associated therewith;
FIGURE 14 is a detailed circuit diagram of a ciruit corresponding to the block diagram of FIGURE 1;
FIGURE 15 shows a hybrid high-speed switching system employing controlled rectifiers;
FIGURE 16 is another hybrid switching system incorporating the present invention;
FIGURE 17 is a simplified block diagram of a hybrid switch which includes auxiliary contacts; and
FIGURE 18 shows the operation of the auxiliary switches shown in FIGURE 17 as related to the operation previously described with reference to FIGURES 3–12.

A hybrid system for switching power from an amplifier to either one of two associated loads is schematically illustrated in FIGURE 1. Incoming signal is applied along the line 11 to the amplifier 12. The amplified output signal can be applied to load A or load B by the parallel combination of the mechanical switch 13 and electronic switch 14. The switches are activated or switched in response to signals from the control circuit 16 which provides a switching signal in response to a switching command. Such a command may be the activation of a mechanical switch, or a command signal from an associated control circuit. The switching signal from the control circuit is applied to both the mechanical and the electronic switch. At the instant the mechanical switch is in transition from one closed position to the other, the electronic switch conducts all the power from the amplifier to the load. As soon as the mechanical switch is closed, it carries the power from the amplifier to the load.

Referring to FIGURE 2, there is schematically illustrated the mechanical switch 13 in the form of a single-pole double-throw switch which is actuated by energizing the coil 21 which moves the arm 22 between the contacts 23 and 24 connected to loads A and B, respectively. As previously described, the mechanical switch generally includes relatively heavy contacts and wide spacing whereby the inertia of the partsand the distance of travel of the arm requires several milliseconds for switching from one position to the other.

The electronic switch 14 is connected in parallel with the mechanical switch to provide rapid switching. The electronic switch provides paths 26 and 27 connected to the loads A and B, respectively. Each of the paths 26 and 27 includes a pair of diodes 28a, 28b and 29a, 29b connected in a push-pull arrangement. Blocking capacitors 31 are connected in series with the diode of each pair to isolate the RF loads from the DC switching signals. Switching signals are applied to the diode along lines 32a, 32b and 33a, 33b. Series chokes 34 isolate the DC switching supply from the RF signals being switched.

The voltage-current characteristics of a typical diode are shown in FIGURE 13. The DC bias voltage 36 is required to bias the diode in the "off" condition so as to block the transfer RF signals 37. The DC bias voltage is greater than the maximum or peak RF signal to thereby assure that the diode does not conduct during any part of the RF cycle. Current 38 is required to render the diode conductive to conduct or pass the RF current 39.

In operation, voltages are applied to one push-pull pair of the diodes to reverse bias the same to turn them fully off while current is drawn through the other pair of diodes to render the diodes fully conducting whereby to transfer the RF energy from the amplifier to the load. The push-pull arrangement of the diodes reduces the current per diode and also tends to balance out the effects of residual non-linearities in the forward biased operation of the diodes.

A typical switching signal applied to the control circuit 16 is shown in FIGURE 3. The control circuit generates a pulse which energizes the coil 21 of the electromechanical switch 13. The pulse is slightly delayed from the switching signal pulse. The voltage pulse applied to the coil is shown in solid line in FIGURE 4. A typical current through coil 21 is shown in dotted line, FIGURE 4, rising from zero. The dip in the current waveform corresponds to closing of the switch. It has been observed that there is an instantaneous decrease in the current through the coil on closure of the switch.

FIGURE 5 illustrates the movement of the arm 22 as it opens one contact closure, for example, 23 (FIGURE 2) and moves to close the other contact closure, for example 24. At the instant that the voltage is applied to the coil 21, the control circuit also applies a pulse to the diodes 28a and 28b which forward biases the diodes. This completes the circuit between line 10 and the load A in FIGURE 2. It is observed that the pulse applied forward biases the diodes prior to opening of the switch at contact 23 and that the pulse terminates before the contact 24 closes. Thus, during opening of the contact, the current is carried substantially entirely by the diodes. Opening of the circuit between line 10 and load A is achieved solely by the rapid action of the diodes as the forward biasing pulse terminates. Simultaneously, as seen in FIGURE 8, a reverse bias voltage is applied to the diode to reverse bias the same.

Up to the time that the diodes 28a, 28b are switched to "off," there is a reverse bias current applied to the diodes 29a, 29b. Simultaneously with the application of reverse bias voltage to diodes 28a and 28b, the reverse bias is removed from the diodes 29a, 29b. The control circuit applies a forward bias pulse to the diodes 29a, 29b which serves to forward bias the diodes and complete the path between line 10 and load B. This closure takes place prior to the closing of the contact 23. The voltage pulse shown in FIGURE 9 is applied for a period of time which extends beyond the time that closure is made with contact 24.

To eliminate any transitions, jitter or the like during the switching operation, a keying signal may be applied such as shown in FIGURE 10 which serves to turn off the transmitter applying power to the line 10. The output signal on the lines A and B is shown in FIGURES 11 and 12, with the load A having the signal applied until it is switched to the load B. The gap corresponds to the time the transmitter is keyed off.

Referring to FIGURE 14, there is shown a hybrid switching system in which the control signals (forward current and blocking voltages) are provided from a control circuit including a power supply, a reed relay (low power relay), and a resistive network. The reference numerals applied to the hybride switching circuit correspond to those used in connection with the description of the circuit of FIGURE 2.

The reed relay includes coils 86 and 87 which operate the movable arms 38 and 39, respectively. In the embodiment shown, the switching command or signal is applied by closure of switch 41 which connects the power supply 42 to the coils. The power supply 42 also serves to energize the coil associated with the main mechanical switch to switch the power from one load to the other, for example, from load A to load B.

Referring more particularly to the circuit for providing the switching control signals, it includes a power supply 46 which has positive and negative terminals and a ground terminal. The positive terminal is connected to the coils 34 associated with the diodes 28b and 29b by resistors 47 and 48. The negative terminal is connected to the coils 34 associated with the diodes 28a, 29a by resistors 51 and 52. Switch contact arms 88, 89 are resistively connected to the plus terminal by resistors 53 and 54.

To explain operation of the switching circuit, assume that the switch 41 has just been activated to energize the coils 86 and 87 to move the arms 88 and 89 to the position shown. In this position, resistors 51, 53, 47 and 54 act as a voltage divider with the voltage at the common terminal being applied to reverse bias the diodes 29a and 29b to turn them off. The values of the resistors are selected so that a positive voltage greater than the peak RF voltage is applied to diode 29a, and a negative voltage greater than the peak RF voltage is applied to the diode 29b. Diodes 28a and 28b are connected to the positive and negative lines, respectively, by resistors 52 and 48, and sufficient current is drawn to forward bias the diodes to turn them completely on. The common terminal is, therefore, connected to load A. As previously described, after a predetermined period of time, the main switch 42 closes and connects the common line to the load A through the relatively large contacts. The resistance offered by these contacts is substantially lower than that offered by the forward biased diodes whereby substantially all the current is carried by the mechanical switch.

The next depression of the switch 41 serves to move the arms 88 and 89 to their other position whereby negative and positive voltages are connected to diodes 28a and 28b, respectively, to turn them off. At the same time, current is drawn directly through the diodes 29a, 29b to turn them fully on.

It is, therefore, seen that a relatively low power device, the reed relay, serves to apply control voltages to the diodes which provide an instantaneous current path for switching during the time the main power is being switched by the high power mechanical switch from one load to the other. Because of the relatively short time during which the power flows, the total power dissipated in the diodes is relatively small, and conventional low power diodes may be used for switching relatively high power. The particular circuit for applying the control voltage is merely an illustration of possible circuits. It is, of course, to be understood that other control circuits using solid state devices may be employed for applying, in response to a manual or electronic switching signal, the proper voltages and draw the proper currents from the diodes 28a, 28b, 29a and 29b.

Although switching diodes have been illustrated as momentarily carrying current, other high speed solid state devices may be employed. In FIGURE 15, there are shown controlled rectifiers 61 and 62 connected in parallel with the switch 42 and serving to instantaneously carry the current in response to the DC switching signal applied to the lines 63 and 64, respectively.

It is further to be appreciated that although a balanced circuit for switching from one load to another has been described, it is possible to employ the concept of the present invention to a simple switch which serves to connect or disconnect a load such as load 72 to a source of power, for example, the source 71, FIGURE 16. The main switch includes a control coil 21a which serves to move a switching arm 22a and close the same to connect the source 71 to the load 72. Disposed in parallel with the switch contacts is a diode 73 which is placed in series with a blocking capacitor 74. The diode is activated by applying a signal along the line 76. The control line may include a choke 77 for blocking AC signals. The capacitor 74 serves to block the DC signals from the load.

Thus, when the activation signal is applied to the terminals 78, a signal is simultaneously applied to the diode 73 which serves to instantaneously turn on the diode while the coil 21a is being energized and the contact arm 22a moves to its closed position.

Referring to FIGURE 17, there is shown a block diagram of a switching circuit of the type described above. In addition, there is provided auxiliary contact associated with the loads A and B, which auxiliary contacts are placed in series with the electronic (diode) switches. The purpose of the auxiliary contacts is to disconnect the diodes entirely from the circuit until just prior to and just subsequent to their use in a switching operation. Thus, referring to FIGURE 18, it is seen that the auxiliary contact associated with the circuits A and B are closed only during the switching period.

Thus, it is seen that there has been provided a high power, high-speed switch in which during the interval when a mechanical switch having relatively large movement and high inertia is being switched from an open to a closed condition, or from one position to another, the power is carried by relatively low power, high speed solid state devices such as diode controlled rectifiers and the like. Since the solid state devices are only operative for relatively short periods of time, the amount of energy dissipated in the same is relatively small. The devices are capable of withstanding power for the time that the main switch is switching from one position to the other.

I claim:

1. A high-speed switching system for selectively connecting a source of power to first and second loads comprising a mechanical switch having a common terminal and a pair of contacts one associated with each of said loads, a movable arm serving to selectively connect the common terminal to one of said contacts, a coil adapted to control movement of said arm responsive to a switching signal applied to the same, a pair of circuits each including semiconductor switching means connected in shunt between the common terminal and each of said contacts to thereby form two shunt paths, means for selectively controlling said semiconductor switching means in said paths whereby to block one path for power flow between the common terminal and the associated contact and to render the other path conductive to pass the power from the common terminal to the associated contact during the period of time that the switch arm is moving from one contact to the other.

2. A high-speed switching system as in claim 1 wherein said means for controlling said semiconductor switching means serves to activate the semiconductor switching means so that a conductive path is provided for a period which extends to just before and after opening or closing.

3. A high-speed switching system as in claim 1 including an auxiliary switch connected in series with said semiconductor switching means.

4. A high-speed switching system as in claim 1 in which said source of power is an AC power source and said semiconductor switching means is responsive to a DC switching signal and including means connected in said shunt paths for isolating said loads from the DC switching signal.

References Cited

UNITED STATES PATENTS

| | | | |
|---|---|---|---|
| 3,237,030 | 2/1966 | Coburn | 307—136 X |
| 3,293,496 | 12/1966 | Induni | 307—136 X |
| 3,321,668 | 5/1967 | Baker | 307—136 X |
| 3,339,110 | 8/1967 | Jones | 307—136 X |

ROBERT K. SCHAEFER, *Primary Examiner.*

T. B. JOIKE, *Assistant Examiner.*

U.S. Cl. X.R.

317—11